United States Patent [19]

Simpson

[11] Patent Number: 5,392,591
[45] Date of Patent: Feb. 28, 1995

[54] HAY RECOMPRESSION AND NETTING MACHINE

[75] Inventor: Bret A. Simpson, Ellensburg, Wash.

[73] Assignee: International Packaging Incorporated, Ellensburg, Wash.

[21] Appl. No.: 30,676

[22] Filed: Mar. 12, 1993

[51] Int. Cl.6 .................. B65B 25/02; B65B 1/24; B65B 9/15; B65B 9/14

[52] U.S. Cl. ........................ 53/435; 53/438; 53/450; 53/459; 53/515; 53/530; 53/567; 53/576

[58] Field of Search ............... 53/469, 435, 436, 438, 53/514, 515, 529, 530, 567, 576, 389.4, 450, 459; 100/98

[56] References Cited

U.S. PATENT DOCUMENTS

| | | | |
|---|---|---|---|
| 2,413,556 | 12/1946 | Fourness et al. | 226/2 |
| 3,088,499 | 5/1963 | Rieger | 141/81 |
| 3,129,658 | 4/1964 | Valente | 100/218 |
| 3,461,646 | 8/1969 | Lane et al. | 53/515 |
| 3,501,890 | 3/1970 | Hunt | 53/529 |
| 3,650,298 | 3/1972 | Delmar | 53/469 X |
| 3,662,514 | 5/1972 | Goss | 53/469 |
| 3,802,337 | 4/1974 | St-Hiliare | 53/530 X |
| 3,805,480 | 4/1974 | Cherio et al. | 53/576 X |
| 3,812,642 | 5/1974 | Mintz et al. | 53/21 R |
| 3,815,323 | 6/1974 | Longo | 53/530 |
| 3,838,551 | 10/1974 | Arikawa et al. | 53/530 |
| 3,974,628 | 8/1976 | Konstantin | 53/389.4 X |
| 4,144,631 | 3/1979 | Fujio | 29/446 |
| 4,676,153 | 6/1987 | Ast | 100/7 |
| 4,718,335 | 1/1988 | Ast | 100/3 |
| 4,763,574 | 8/1988 | Ast | 100/98 R |
| 4,917,008 | 4/1990 | van den Wildenberg | 100/5 |
| 5,001,974 | 3/1991 | Gombos | 100/4 |
| 5,012,631 | 5/1991 | Hostetler et al. | 53/588 |
| 5,088,271 | 2/1992 | Westaway | 53/529 X |
| 5,090,182 | 2/1992 | Bethge | 53/556 |

FOREIGN PATENT DOCUMENTS

| | | |
|---|---|---|
| 0180112 | 7/1990 | Japan . |
| 593173 | 9/1975 | Switzerland . |
| 1204467 | 7/1990 | United Kingdom . |

Primary Examiner—Horace M. Culver
Attorney, Agent, or Firm—Christensen, O'Connor, Johnson & Kindness

[57] ABSTRACT

An apparatus for compressing and containing a material in an elastomeric net(26). The apparatus comprises a compression chamber(12), a material compressor(16), a holding chamber(18), a net expansion and placement mechanism (42), and a bale advance mechanism (20). The material compressor is coupled to the compression chamber to compress a selected amount of the fibrous material in a direction transverse to the general lay of the material within the compression chamber to form a compacted bale (10). The holding chamber has an outlet and an inlet coupled to the compression chamber. The holding chamber also has an axis defined by a line extending between the center of the inlet to the center of the outlet. The net expansion and placement mechanism is for receiving the net, stretching the net to obtain a cross-sectional shape that is slightly larger than that of the holding chamber, and placing the net over the holding chamber with one end of the net slightly extending beyond the outlet. The bale advance mechanism is coupled to the holding chamber and compression chamber. Its function is to advance the bale from the compression chamber to the holding chamber and through the holding chamber outlet such that the bale contacts the end of the net that extends beyond the outlet and pulls the net onto the bale when the bale advances through the outlet.

31 Claims, 9 Drawing Sheets

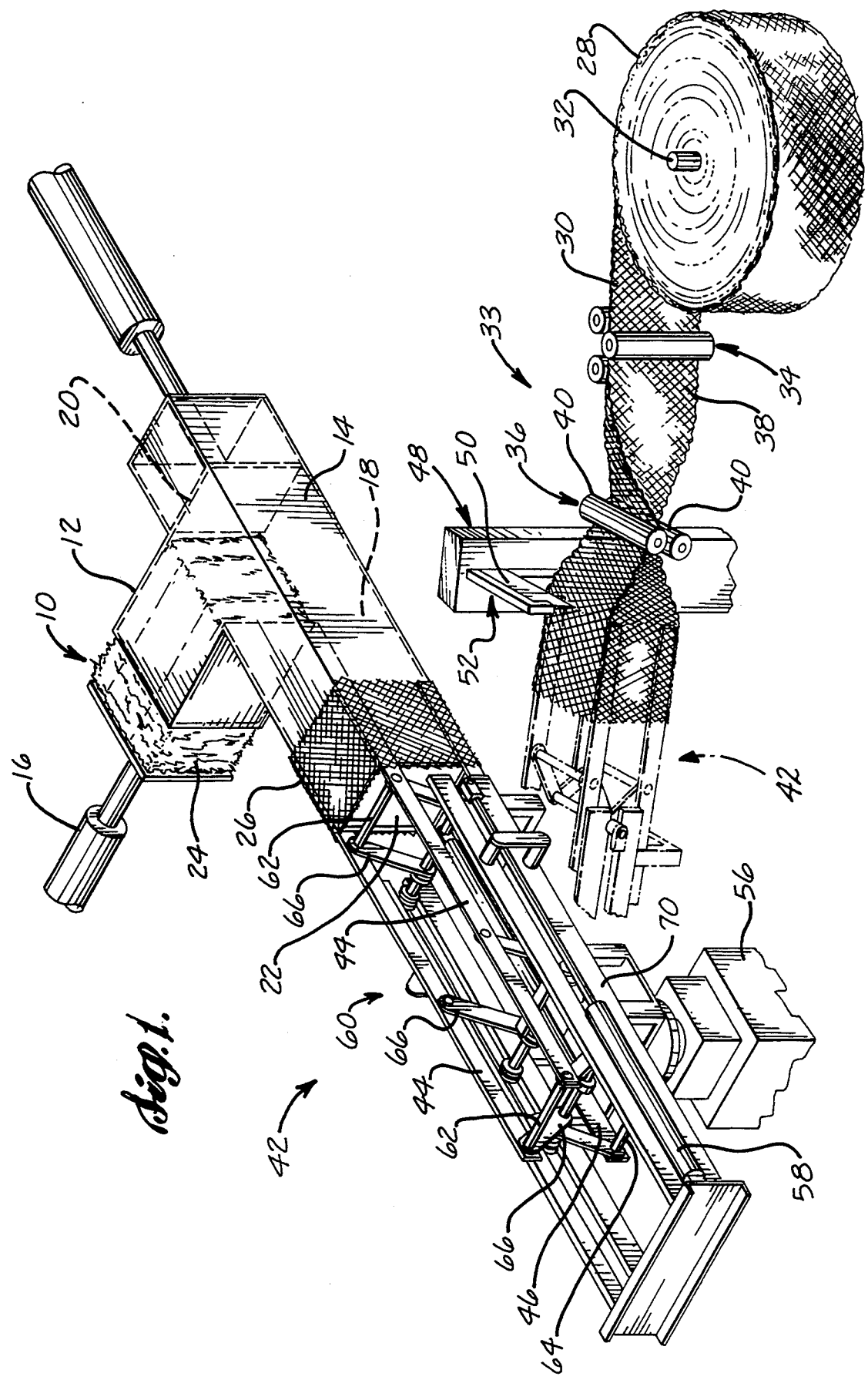

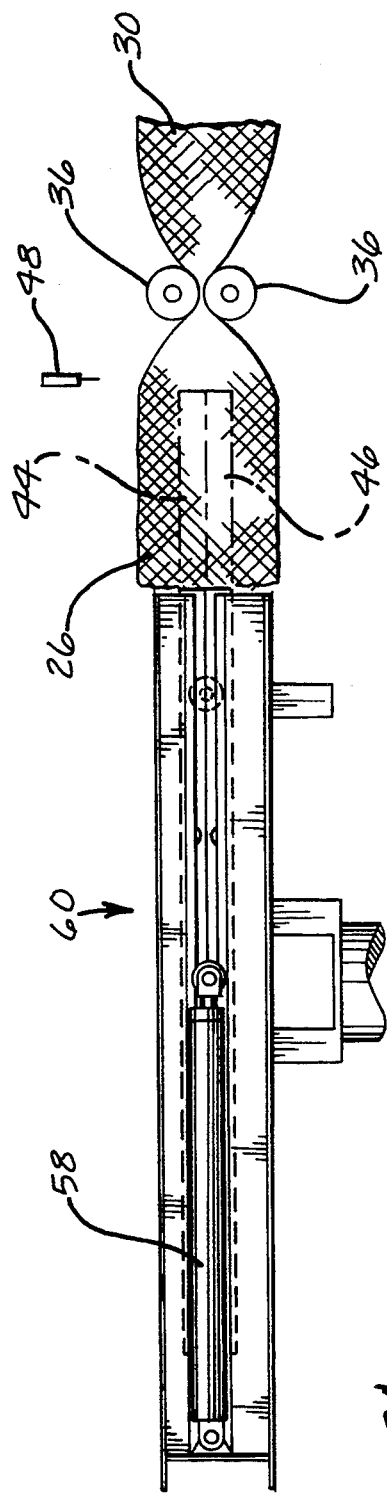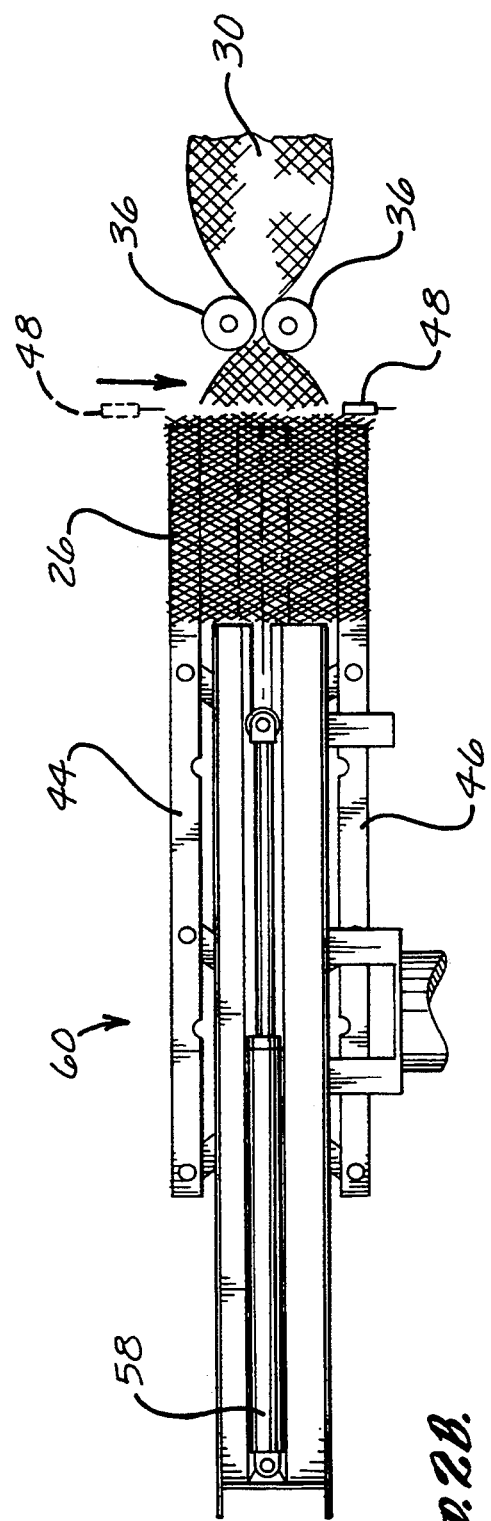

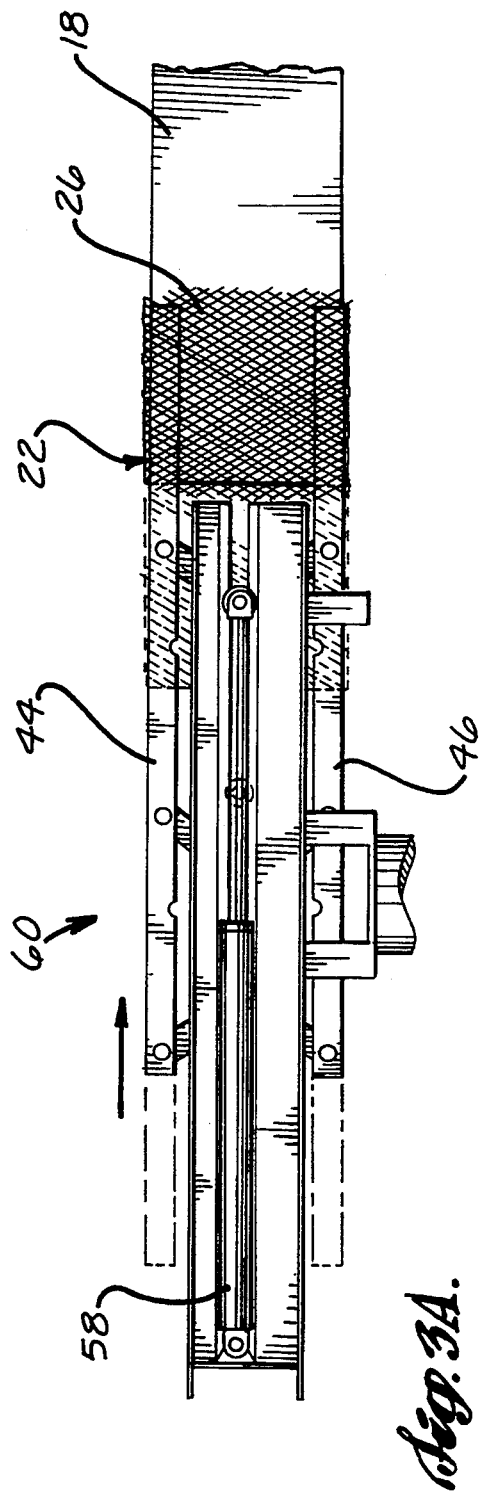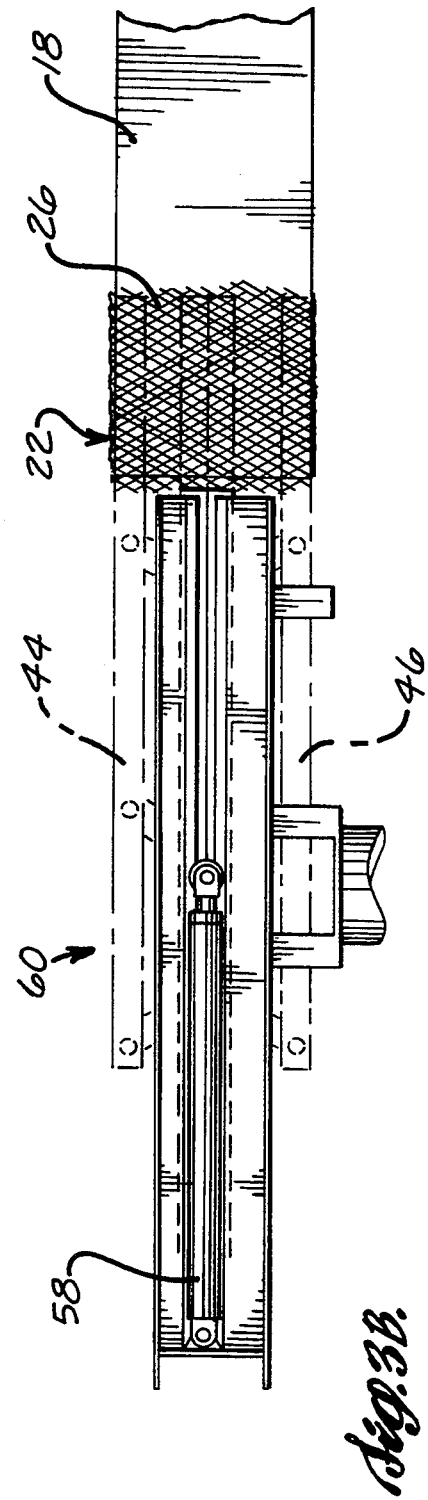

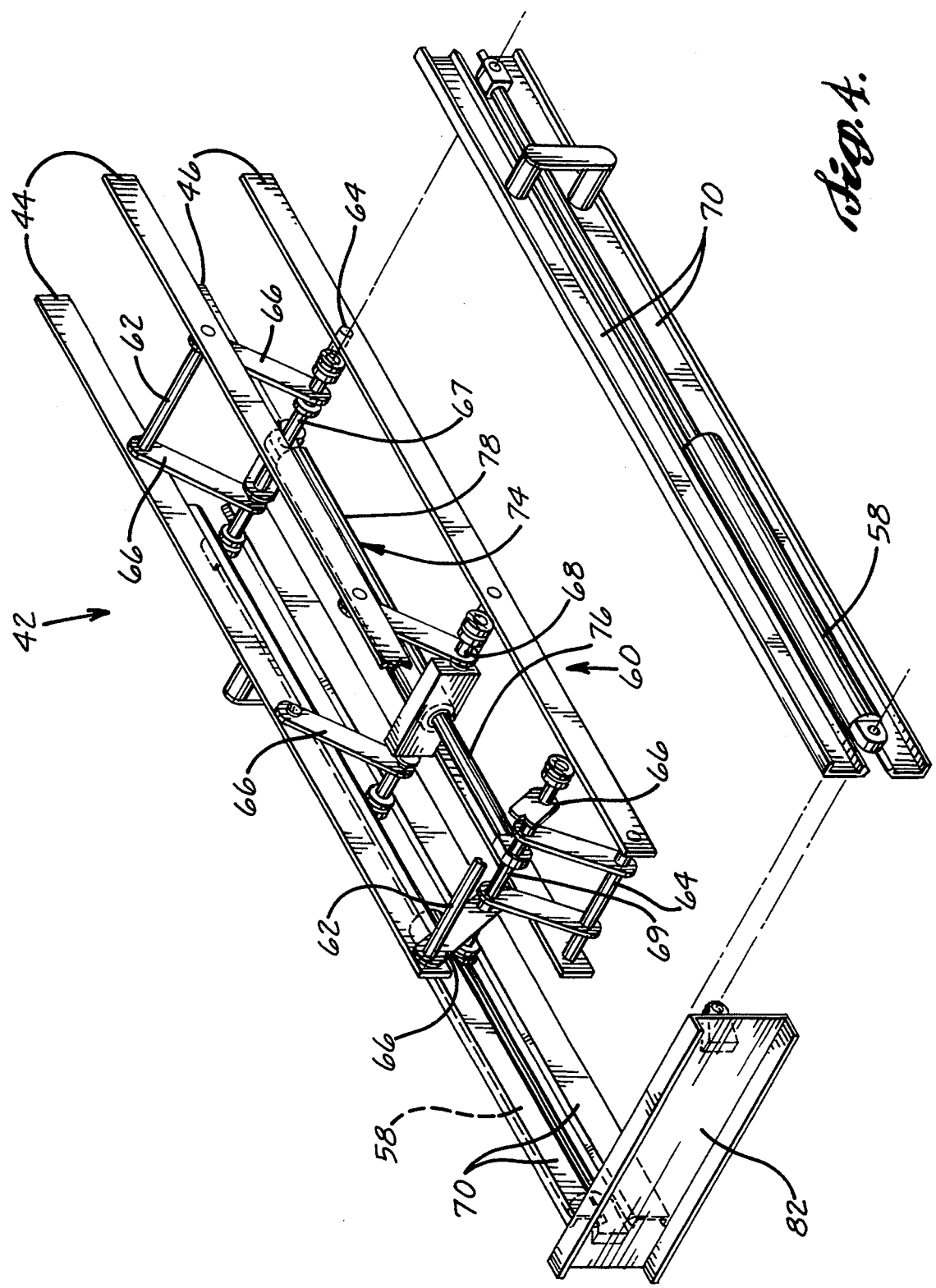

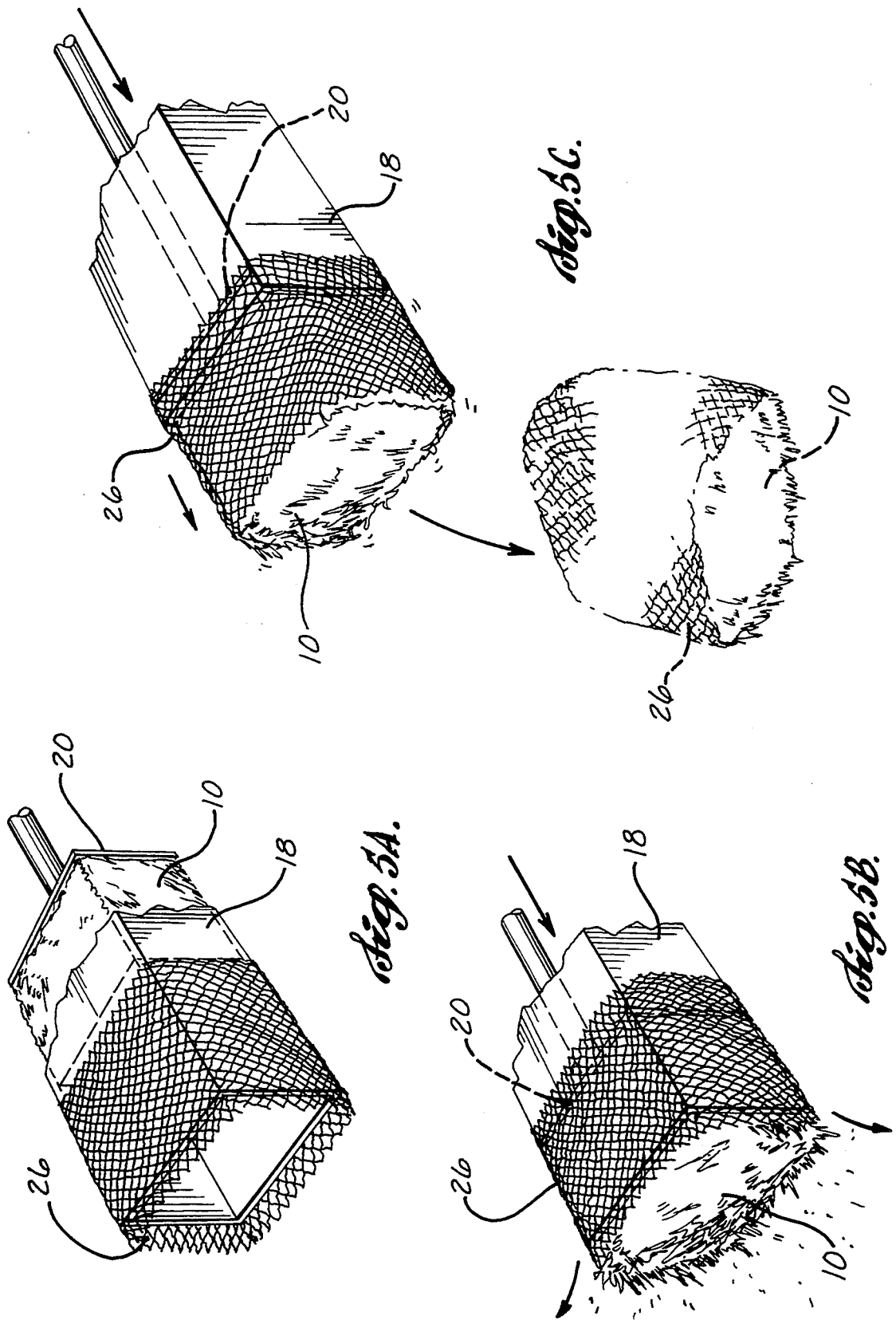

HAY RECOMPRESSION AND NETTING MACHINE

FIELD OF THE INVENTION

This invention relates generally to an apparatus and a method for containing a compressed bale of material, and more particularly, to an apparatus and a method for recompressing and netting bales of hay.

BACKGROUND OF THE INVENTION

Hay or other agricultural products are typically compressed and baled in the field with twine or strapping in bales measuring about 16×18×48 or 16×21×48 and weighing approximately 95–135 pounds. Compressing the baled hay into smaller units (i.e., recompressing or double compressing) is often desirable prior to shipment or storage to save space and increase ease of handling. This is desirable, for example, if the hay is shipped overseas and space aboard ship is costly. In some countries, storage space is also scarce and costly.

Once the baled hay is recompressed it must be tied together in some manner to maintain its reduced size. Conventional methods of holding the recompressed bale together include using twine which is knotted on the ends or strapping. However, knotters and strappers are expensive to operate and unreliable with recompressed hay bales. Typically three to five percent of the hay is lost in recompression due to problems inherent in these processes, including the twine or straps breaking, or the knots or straps coming undone. This not only results in large amounts of wasted hay, but also in costly down time to keep the strappers or knotters up and running. Besides, the straps as well as the twine are not usually recycled due to the difficulty in doing so. These prior processes are also not reliable for a highly compressed bale since the outward force of the hay may break the twine or strapping.

Another problem arises during shipment of tied or strapped hay. The recompressed bales may lose some of the hay out the sides. Also the straps or twine may break during handling causing loss. Since typically only a few straps or strings of twine are used, if one of these is damaged or completely cut the bale will completely fall apart. The bonds which hold the strapping together and the twine may break during loading, shipment, unloading, or transport to the customer or anytime while the hay is handled. The damage tolerance of a knotted or strapped recompressed bale is often not high enough to withstand an impact from dropping the bale. Typically one to two percent of the hay is lost during shipment and handling after recompression.

Methods of holding the recompressed hay together which solve some of the problems discussed above have been examined and found unsatisfactory. For example, stretch wrap plastic may be used: however, it tends to cause the hay to bleach and sweat, making the hay moldy and unattractive to a purchaser. Using black plastic solves the bleaching problem but still causes molding and obscures viewing the quality of the hay.

Other methods have been used to contain other materials. For example, a method of baling fibrous material is disclosed in Great Britain Patent No. 1,204,467. There the material is compressed and pushed into a solid-walled strapped container. The straps hold the bale together in its compressed form and the container prevents material from falling out between the straps. This method suffers from having to manually place the bag and straps over the outlet tube. It is also a costly procedure since both a bag and several straps must be used to contain the material. The straps or "binding cords" also have the same disadvantages as conventional baling twine: They are not readily recyclable, thus wasteful and expensive: they may not be reliable for a highly compressed bale, and are difficult and thus expensive to secure in place. Besides, if any one of the cords is cut or breaks the bale may fall apart.

In consideration of the limitations and disadvantages of the devices and methods currently in use, it should be apparent that an effective solution to the problem of containing a compressed bale of material such as hay is needed. Accordingly, the present invention was developed, and provides significant advantages over previous devices or methods to contain compressed materials.

SUMMARY OF THE INVENTION

In accordance with this invention, an apparatus for compressing and containing material in an elastomeric net is provided. One embodiment of the apparatus includes a compression chamber, a material compressor, a holding chamber, a net expansion and placement mechanism, and a bale advance mechanism. The material compressor is coupled to the compression chamber to compress a selected amount of the material (typically fibrous) in a direction transverse to the general lay of the fibers within the compression chamber to form a compacted bale. The holding chamber has an outlet and an inlet coupled to the compression chamber. It also has a holding chamber axis defined by a line extending between the center of the inlet to the center of the outlet. The net expansion and placement mechanism is for receiving the net, stretching the net into a cross-sectional shape that is slightly larger than that of the holding chamber, and placing the net over the holding chamber with one end of the net slightly extending beyond the outlet. The bale advance mechanism is coupled to the holding chamber and compression chamber and is used to advance the bale from the compression chamber to the holding chamber. The bale advance mechanism also advances the bale through the holding chamber outlet such that the bale contacts the end of the net that extends beyond the outlet and pulls the net onto the bale. When the bale is advanced through the holding chamber outlet, it is oriented such that the general direction of the fibers is parallel to the holding chamber axis.

In accordance with a particular aspect of this invention, the netting is supplied as part of a continuous length of elastomeric tubular material, the apparatus further comprising a shear to cut the tubular material at a predetermined length.

In accordance with another aspect of this invention, the apparatus further comprises a least one cutter disposed at the output end of the holding chamber for subdividing the bale before it enters and is contained within the netting. In one particular embodiment, this aspect of the invention is at least one blade positioned across the end of the holding chamber outlet such that as the bale is advanced through the outlet, the blade cuts the bale into multiple portions. In another embodiment this cutter comprises at least one blade positioned perpendicular to the holding chamber axis, the blade cutting the bale into multiple portions before it enters the netting. In another embodiment cutters arranged to cut both perpendicular and parallel to the holding chamber axis are combined to divide the bale into multiple portions before it exits the holding chamber into the netting.

In accordance with another aspect of this invention, the compression chamber and the holding chamber comprise a plurality of walls forming a rectangular tube. The plurality of walls include a first wall being positioned to oppose the compressive force of the material compressor and a second wall being positioned opposite the first wall to restrain the material in its compressed form as it is advanced in the holding chamber. In one particular embodiment, at least portions of the cross-sectional shape of the insides of the first wall and the second wall slope toward the inside of the holding chamber and the compression chamber. In this manner, as the bale exits the holding chamber and tends to expand at its compressed sides into the net it assumes more of a true parallelepiped shape.

In accordance with another aspect of this invention, the material compressor and the bale advance mechanism comprise rams with pistons substantially matching the cross-sectional shapes of the chambers in which they operate.

In accordance with another aspect of this invention, the net expansion and placement mechanism comprises a plurality of parallel bars coupled together with a bar movement mechanism to move at least one of the bars away from at least one other of the bars to expand the container for placement over the output end of the holding chamber. The bar movement mechanism also includes an actuator to move the plurality of bars along an axis parallel to the bars independent of the movement of the bars away from or toward each other so that the expansion and placement mechanism can be used to position the container over the output end of the holding chamber and the bars can be retracted therefrom.

In one particular embodiment of the net expansion and placement mechanism, the bars and the bar movement mechanism are disposed generally surrounding the holding chamber. The movement mechanism is arranged to move the plurality of bars partially beyond the output end of the holding chamber to receive a container for expansion and placement on the output end of the holding chamber.

In another particular embodiment of the net expansion and placement mechanism, the bars and bar movement mechanism are disposed opposite the output end of the holding chamber. The bars are oriented generally parallel to the holding chamber axis. The movement mechanism is arranged to move the plurality of bars partially over the output end of the holding chamber to place a container on the output end of the holding chamber. One aspect of this particular embodiment includes a pivot coupled to the base of the bars and the movement mechanism to swing the bars away from the output end of the holding chamber to allow a container to be received by the bars.

In accordance with another aspect of this invention, the container is supplied from a continuous roll of flattened tubular container material. The roll has a center axis of rotation. In accordance with this aspect, the invention also includes a container feed mechanism disposed adjacent to the plurality of bars for holding the container material and feeding the material onto the ends of the bars and a container cutter positioned between the feed mechanism and plurality of bars.

The container feed mechanism of the invention includes a roll carrier and at least one reflattening roller. The roll carrier has a rotatable connection to a base for holding the roll of container material and allowing it to be pulled off as required. The reflattening rollers are disposed adjacent the roll carrier and have longitudinal axes oriented at an angle to the plane of the flattened tubular container material. In this manner, when the container material is fed through the reflattening rollers the container material receives two creases in addition to the creases preexistent at the edges of its originally flattened sides. The two additional creases along with the original creases cause the previously flattened tube of container material to assume a box-like cross-sectional shape.

In one embodiment, the container feed mechanism also includes at least one feed roller oriented parallel to the roll axis of the container material. The feed rollers are disposed between the roll carrier and the reflattening rollers and are used for pulling a portion of container material from the roll as needed.

This invention is also directed to a method for inserting a bale of compressed material into an elastomeric container. The steps of the method are generally consistent with the function provided by the elements of the apparatus discussed above.

The advantages to the apparatus and method of the present invention are numerous. Netted bales of compressed material are efficiently produced that are more damage tolerant than was previously possible. Because the bales are more completely and compactly contained, savings are realized due to reduced storage and shipment space requirements and due to minimal material loss in handling and storage. Because of the superior containment provided by the apparatus and method of the present invention, the netted bales may even be cut into subdivisions without significant material loss.

The netted bales producing according to the present invention also have the advantage of being able to breathe so that no damaging condensation occurs. The bales may be visually inspected quite readily as well.

Another advantage is realized after use of the bales. In contrast to other containment materials, the netting material is easily recyclable into new netting or other articles.

Further advantages will be appreciated as the present invention is examined more fully below in the Detailed Description of the Preferred Embodiments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of a preferred embodiment of the invention, illustrating the feed mechanism, expansion and placement of the net, and recompression of a bale of hay;

FIG. 2A is a side elevational view of the invention, illustrating the positioning of the bars within the netting material;

FIG. 2B is a side elevational view of the invention, illustrating expansion of the netting material and cutting of the netting material to prepare a net suitable for placement on the holding chamber of the invention;

FIG. 3A is a side elevational view of the invention, illustrating the positioning of the net over the outlet of the holding chamber;

FIG. 3B is a side elevational view of the invention, illustrating retraction of the bars to place the net in contact with the holding chamber;

FIG. 4 is a partially exploded perspective view of the expansion and placement mechanism of the invention, illustrating the bars and movement mechanism;

FIG. 5A is a perspective view of the outlet of the holding chamber of the invention, showing a bale being advanced through the holding chamber with a net prepared to receive the bale;

FIG. 5B is a perspective view of the outlet of the holding chamber of the invention, showing a bale being advanced into the portion of the net that extends over the outlet of the holding chamber;

FIG. 5C is a perspective view of the outlet of the holding chamber of the invention, showing a bale being advanced completely through the outlet of the holding chamber and into the net to form a netted bale;

DETAILED DESCRIPTION OF THE PREFERRED EMBODIMENTS

Figure 6:
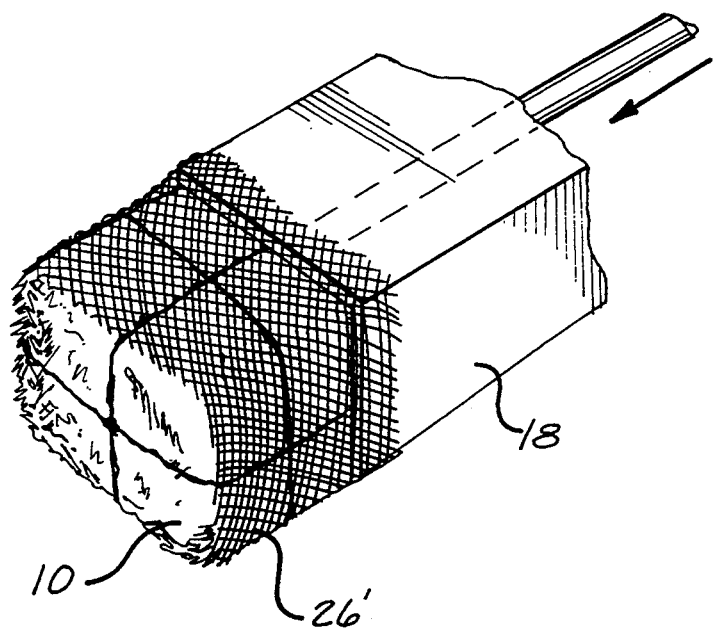
FIG. 6 is a perspective view of the outlet of the alternate embodiment, showing multiple bales being advanced completely through the outlet and into a single net.

A preferred embodiment of the present invention is illustrated in FIG. 1. A bale 10 of hay or other product is recompressed and netted in the preferred embodiment of the invention in the following manner. A standard bale 10 is loaded into a compression chamber 12 where it is compressed between a wall 14 of the compression chamber 12 and a compression piston 16. Bale 10 is then advanced through holding chamber 18 in response to a force applied to it from an advancement piston 20 in a direction generally transverse to the direction of compression. When compressed bale 10 reaches an outlet 22 of the holding chamber 18 its leading edge 24 contacts a net 26. Further advancement of bale 10 out holding chamber 18 pulls net 26 from the outside of holding chamber 18 onto bale 10. Bale 10 completely exits holding chamber 18 with net 26 surrounding at least part of four sides of bale 10. Bale 10 expands upon exiting from holding chamber 18, however, net 26 has sufficient strength and has been elastically stretched sufficiently to retard excessive expansion of bale 10 (the stretching of net 26 is explained in more detail below). Recompressed bale 10 produced according to the preferred embodiment of the invention has dimensions of approximately 16×18×48 or 16×22×48.

Net 26 is supplied by continuous roll 28 of flattened elastomeric net material 30. Net material 30 is elastomeric, in the preferred embodiment being made of high density polyethylene (HDPE). HDPE netting is the preferred material, but other materials are alternatively used, such as polypropylene, nylon, and polyvinyl chloride (PVC). HDPE is used in the preferred embodiment due to its lower cost, safety (HDPE can be FDA approved), and recyclability. The specific nominal characteristics of the HDPE preferably used include a density of 0.944 g/cm$^3$, a tensile strength at yield of 3,200 psi, 500% elongation at break, a melting point of 257° F., a secant modulus of elasticity of 99,000 psi, and thermal expansion of $1 \times 10^4$ in/in/°F. An alternative to using a continuous length of supply net material 30 is to use precut lengths of net material 30. The precut lengths would be positioned on holding chamber 18 with bars 44, 46 in the same manner as described above after the continuous netting is cut.

Roll 28 is coupled to spool 32. Spool 32 is rotatably connected to a first base (not shown) so as to allow net material 30 to be pulled from roll 28. The net material then extends through a feed mechanism 33 including a set of three feed rollers 34 that help pull net material 30 from roll 28 and feed it to two reflattening rollers 36. Reflattening rollers 36 are oriented transverse to flat surface 38 of net material 30 so that as net material 30 extends through reflattening rollers 36 two new creases 40 are introduced into material 30. This causes net material 30 to assume a rectangular cross-sectional shape as it extends out of reflattening rollers 36. Reflattening rollers 36 can be oriented at an angle other than 90 degrees from feed rollers 34 and flat net material 30. In such a case a box shape would still be formed—one with a rectangular cross section instead of square. Roll 28 of net material 30 and feed and reflattening rollers 34, 36 could also be oriented at an angle so that net material 30 comes out of reflattening rollers 36 with a horizontal bottom surface.

Net expansion and placement mechanism 42 is used to expand net 26 after it is fed through reflattening rollers 36. To do so, two sets of two bars 44 and 46 are used. In order to expand net 26, sets 44 and 46 are retracted together in a narrow configuration and then advanced forward into a position inside the end of net material 30 after it exits reflattening rollers 36 as best seen in phantom in FIG. 1 and FIGS. 2A and 2B. Bars 44, 46 are then separated to expand and stretch net 26 as shown in FIG. 2B. Net 26 is expanded sufficiently to provide a cross-sectional area greater than that of the outside of outlet 22 of holding chamber 18 for placement thereon. Cutter 48 then cuts net 26 just beyond bars 44, 46 leaving net 26 ready for placement on the end of holding chamber 18. Cutter 48 preferably includes shear 50 that cuts net 26 with blade 52. In alternative embodiments, a hot wire 54 of other cutter configurations could be used.

In the preferred embodiment, expansion and placement mechanism 42 is pivotally mounted to second base 56 to allow it to swing from a position in which it receives net material 30 from feed mechanism 33 to a position in parallel alignment with holding chamber 18, opposite holding chamber outlet 22. Once in alignment with outlet 22, expansion and placement mechanism 42 utilizes a positioning actuator 58 to position net 26 over outlet 22 of holding chamber 18. A hydraulic cylinder and ram actuator is shown in FIG. 1, although other means for moving and positioning expansion and placement mechanism 42 could be utilized.

Once net 26 is in position over outlet 22 of holding chamber 18, expansion and placement mechanism 42 retracts sets of bars 44 and 46 together and pulls them away with positioning actuator 58 leaving net 26 on the outlet of holding chamber 18. Expanded net 26 is left on holding chamber 18 with at least a small portion of net 26 extending beyond outlet 22 end so as to come into contact with bale 10 as it proceeds out.

The system is preferably at least partially automated so that it continuously goes about a cycle of feeding net material 30 on bars 44 and 46, stretching net material 30 on bars 44, 46, cutting net material 30 for one individual container net 26, placing net 26 on holding chamber 18, compressing bale 10, and advancing bale 10 out the end of holding chamber 18, thus encompassing recompressed bale 10 in net 26. Although of necessity the steps listed are in a particular order, it should be understood that the above order is not critical or necessary. Indeed, many of the above operations take place simultaneously in automated operation of the invention.

Further details of the invention described above and illustrated in FIG. 1 will be set forth below in connection with the remaining figures. FIGS. 2A and 2B illustrate the expansion and cutting of net material 30 to form net 26 ready for positioning on holding chamber 18. As shown in FIG. 2A, net 26 has been fed through reflattening rollers 36 to open up net 26 into a rectangular cross-sectional shape. At this point, positioning actuator 58 is used to extend bars 44 and 46 into net material 30 as shown in phantom while bars 44, 46 are in a retracted position with regard to each other. Because of the retracted position of bars 44, 46 they are able to easily move within the end of unstretched net 26.

As shown in FIG. 2B, bars 44 and 46 are then simultaneously separated by bar movement mechanism 60 to stretch net 26. Bar movement mechanism 60 maintains a parallel relationship between bars 44, 46 during separation. After net 26 has been stretched, cutter 48 moves downward across the end of bars 44 and 46, separating net 26 away from the remainder of net material 30. Because net 26 has already been stretched on bars 44 and 46 net 26 is securely held in place by friction while cutting takes place.

After net 26 is cut, it is ready to be placed on outlet 22 of holding chamber 18. To do so entire net expansion and placement mechanism 42 is swung away from net feed mechanism 33 and into alignment with holding chamber 18, as illustrated in FIG. 1 and in phantom in FIG. 3A. Positioning actuator 58 can then be used to move the ends of bars 44, 46, and thus net 26, over outlet 22 of holding chamber 18. As positioning actuator 58 moves bars 44,46 into position, bar movement mechanism 60 maintains the spatial relationship between bars 44, 46 such that net 26 stays stretched on bars 44, 46. In the preferred embodiment positioning actuator 58 does not move entire net 26 over outlet 22. Preferably one to five inches of net 26 is left to extend beyond outlet 22 so as to come into contact with exiting bale 10 (FIGS. 5A–C).

FIG. 3B illustrates the retraction of bars 44, 46 so that net 26 is left on holding chamber 18. Bar movement mechanism 60 simultaneously brings bars 44, 46 together so that net 26 contacts holding chamber 18 at least at the corners. All bars 44, 46 maintain their mutually parallel orientation during and after retraction. Upper two top bars 44 maintain a fixed relationship to one another as do lower bars 46 with respect to each other. In this manner bars 44 and 46 can be retracted together along the sides of holding chamber 18. In this retracted position, the friction between net 26 and the outside of holding chamber 18 is greater than that between net 26 and bars 44, 46, thus when positioning actuator 58 pulls bars 44, 46 back net 26 stays on holding chamber 18. The portion of net 26 which extends beyond outlet 22 of holding chamber 18 tends to fold inwardly somewhat due to its elasticity. In this manner net 26 is ready to contact and receive an exiting bale 10 as best shown in FIGS. 5A–5C.

The construction of expansion and placement mechanism 42 is best shown in FIG. 4. Expansion and placement mechanism 42 includes bars 44, 46, bar movement mechanism 60, and positioning actuators 58. Placement mechanism 42 is rotatably mounted on second base 56, as illustrated in FIG. 1.

Bars 44, 46 are arranged in sets of two, two upper bars 44 and two lower bars 46. Each set of bars are kept a constant distance apart as they are connected with upper and lower rods 62 and 64. Three sets of upper links 66 connect upper bars 44 to intermediate rods 67-69. These intermediate rods 67-69 are allowed to slide between guide rails 70, which are fixed relative to bar movement mechanism 60 and rotatably coupled to second base 56. Three sets of lower links 72 connect intermediate rods 67-69 to lower bars 46. Bar movement mechanism 60 also includes a bar separation actuator 74. In the preferred embodiment actuator 74 includes a hydraulic ram 76 and cylinder 78 arrangement. The cylinder 78 of actuator 74 is affixed between first and second intermediate rods 67, 68. This cylinder 78 in combination with links 66, 72 connected thereto and bars 44, 46 connected to those links forms two sets of four-bar linkages 80 in the shape of parallelograms. Because four-bar linkages 80 form parallelograms bars 44, 46 are maintained parallel at all times no matter what the distance between them. Ram 76 of bar separation actuator 74 extends to third intermediate rod 69. Upper and lower links 66, 72 extending from third intermediate rod 69 extend with a slope opposite to that of the others of upper and lower links 66, 72 respectively. Due to this arrangement, extension of bar separation ram 76 causes links 66, 72 to push upper bars 44 away from lower bars 46. Retraction of bar separation ram 76 causes links 66, 72 to pull upper bars 44 towards lower bars 46. Bar movement mechanism 60 is maintained in center alignment at all times since intermediate rods 67-69 ride within guide rails 70.

Positioning actuators 58 are connected between a rear member 82, which is affixed to guide rails 70, and first intermediate rod 67. Thus by extension or retraction of positioning actuators 58 bar movement mechanism 60 can be moved in a direction parallel to guide rails 70, which are parallel to bars 44, 46. Clearly, positioning actuators 58 could be connected to any of intermediate rods 67-69 with essentially the same results.

It should be noted that during expansion or contraction of bar separation actuator 74 bars 44, 46 may also move in a direction parallel to bars 44, 46 relative to intermediate rods 67-69. This movement may be countered if desired by compensating movement of positioning actuators 58.

Therefore, as explained above and illustrated in FIGS. 2A–B, 3A–B, and in detail in FIG. 4, net 26 may be expanded and placed on holding chamber 18, ready to receive a bale 10.

The ejection of bale 10 into net 26 and out of holding chamber 18 is shown in FIGS. 5A–C. In FIG. 5A net 26 is shown in position, ready to receive bale 10. Due to the elasticity of stretched net 26 the portion not riding on holding chamber 18 folds inwardly. As shown in FIG. 5B, bale 10 contacts the inwardly folding portion as it advances out holding chamber 18. Since bale 10 is tightly compressed, it has a tendency to expand upon exit from holding chamber 18. The tendency for contraction of net 26 and the tendency for expansion of bale 10 assure that bale 10 will contact net 26 with sufficient friction to pull net 26 from holding chamber 18 and onto bale 10 as it exits the chamber as shown in FIG. 5C.

FIGS. 5A–C illustrate advancement piston 20 contacting bale 10 until it exits holding chamber 18. It is not necessary for advancement piston 20 to push one bale 10 this far. Advancement piston 20, in one embodiment, simply pushes a compressed bale 10 beyond compression chamber 12 so another bale (not shown) can be compressed and pushed, the second bale then pushing the first and so on.

The final result of the present invention is a netted bale which is more damage tolerant. Cost savings are also realized due to saved storage and shipment space and minimal material loss. In the preferred embodiment hay or other agricultural products are recompressed and netted. The resulting netted bale can withstand more abuse such as impacts and partial cuts of net 26 than contained by use of prior art techniques. In contrast to strapped or knotted bales, several strands of net 26 can be severed without the bale falling apart. This also translates to less down time in recompressing and in shipment. Knotters are well-known for their unreliable operation, frequently breaking down and having to be adjusted or repaired. Bales netted according to the present invention also have the advantage of being able to breathe so that no condensation occurs that would cause the hay to become stale and moldy. With the bales netted in this manner the hay can be readily inspected for quality as well.

One advantage to using net material such as HDPE, in addition to its elastomeric properties, is its recyclability. Currently baling straps and twines are not being recycled and tend to pile up causing waste. HDPE can be easily recycled to make more netting or other articles. Another advantage to netting in accordance with this invention is material loss reduction. This reduction occurs not only due to less complete breakage of the bales as discussed above, but also due to better overall containment of the material. A net provides more complete containment of the baled material while still allowing the material to breathe and be seen.

One should also bear in mind that a recompressed bale of hay weighs the same as a standard bale before recompression. This is advantageous to reduce shipment costs and storage space. However, for individual handling it may be desirable to cut each bale in half. This is readily accomplished while still maintaining the integrity of the bale (two bales after the cut) with a netted bale.

The process and apparatus of the invention has been described based on the preferred use and embodiment of the invention. It will be clear to those in the art that modifications to the device as well as the uses of the device can be made. Some alternate uses and modifications are described below. Discussion of these alternatives is not meant to be all inclusive or otherwise limiting.

While netting of hay has been discussed in association with this preferred embodiment, netting or containing other materials in a like manner can also be accomplished with the same basic apparatus and the same basic steps. For example, garbage, straw, or other agricultural products may be compressed and netted by use of the apparatus and/or method of the present invention.

FIG. 6 illustrates another manner in which the basic concept of this invention is utilized. In this alternative embodiment, several bales 10 of hay are unitized by positioning them within a larger holding chamber 18' and pushing them down chamber 18' into a larger net 26' positioned at the end. At least the outer-most bales 10 contact net 26' to pull it over the sides of the bales as they exit chamber 18'. In this manner several bales are unitized simply and efficiently in one large net 26' for shipment or storage. FIG. 6 shows eight bales 10 being unitized. However, a lesser or greater number of bales 10 could be unitized depending upon the size of holding chamber 18'. This same concept of unitizing multiple bales comes into play if a single bale 10 is subdivided and netted together, as described above. Bales 10 (or in the case of a single cut bale, subdivided bale 10) are held together by net 26'. The friction between bales 10 also helps prevent end bales from falling out. In this manner, a unitized stack of bales is created which may be more convenient for shipment and storage. Bales 10 may be unitized in pallet-load sizes to be handled, shipped and stored as units of multiple bales with or without pallets.

Figure 7:
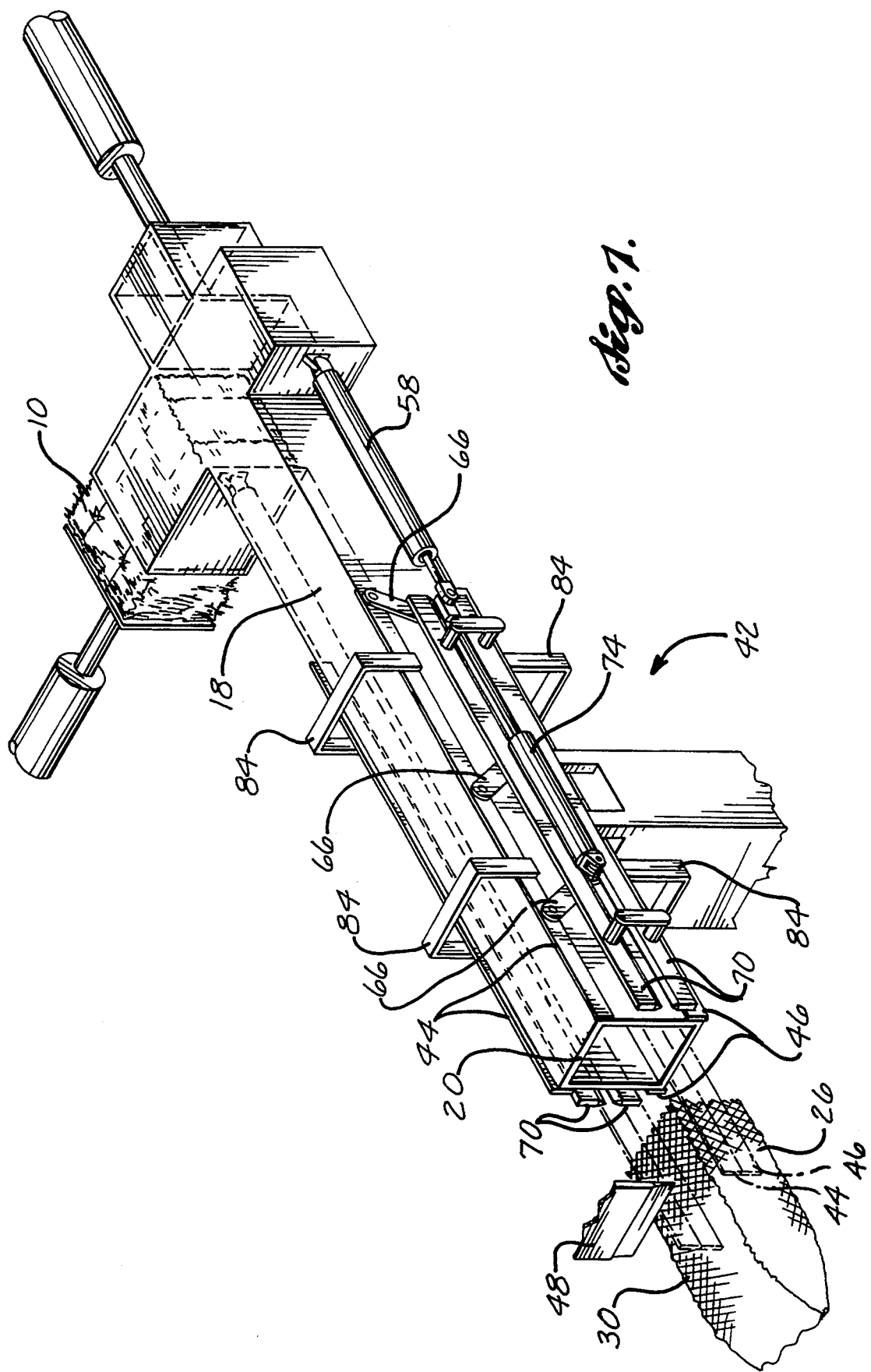
FIG. 7 is a perspective view of an alternate embodiment of the invention, illustrating the expansion and placement mechanism disposed surrounding the holding chamber.

Another alternative embodiment of the invention is illustrated in FIG. 7. In this embodiment expansion and placement mechanism 42 surrounds holding chamber 18. To accommodate this change several elements of mechanism 42 are modified, although the overall function of the device is essentially the same. No mechanism elements are located between bars 44, 46 as in the alternate embodiment described above. To facilitate coordinated movement of upper bars 44 and lower bars 46, braces 84 are provided that arch over holding chamber 18 and affix two upper bars 44 together and the two lower bars 46 together. Four-bar linkages 80 are still intact, although two bar separation actuators 74 are used to form Four-bar linkages 80 on opposite sides of holding chamber 18. Positioning actuators 58 are not overlaying guide rails 70 and connect to the furthest of links 66, 72 from outlet 22 holding chamber 18 as opposed to the nearest of links 66, 72. However, this is simply a design choice since positioning actuators 58 could be overlaid along guide rails 70 over bar separation actuators 74 and attached to the nearest links.

The use of this embodiment (shown in FIG. 7) of the invention is similar to the preferred embodiment. Upper and lower bars 44, 46 are retracted together with bar separation actuator 74 and the rest of bar movement mechanism 60, positioning actuators 58 move bars 44, 46 within the netting, bars 44,46 are expanded with bar movement mechanism 60, net 26 is cut, net 26 is positioned over holding chamber 18 note that net 26 fits between guide rails 70 and bars 44, 46 to fit over holding chamber 18), bars 44, 46 are retracted together, and bale 10 is pushed into net 26. In this particular embodiment bars 44, 46 are not completely removed from contact with net 26 before bale 10 pulls net 26 upon itself. Upper and lower bars 44, 46 are retracted together, however, and do not have enough friction on net 26 in this position to impede net 26 being pulled onto bale 10. In another alternate embodiment of the invention the design is modified to completely remove bars 44, 46 from contact with net 26 by further retraction away from holding chamber outlet 22.

Figure 8:
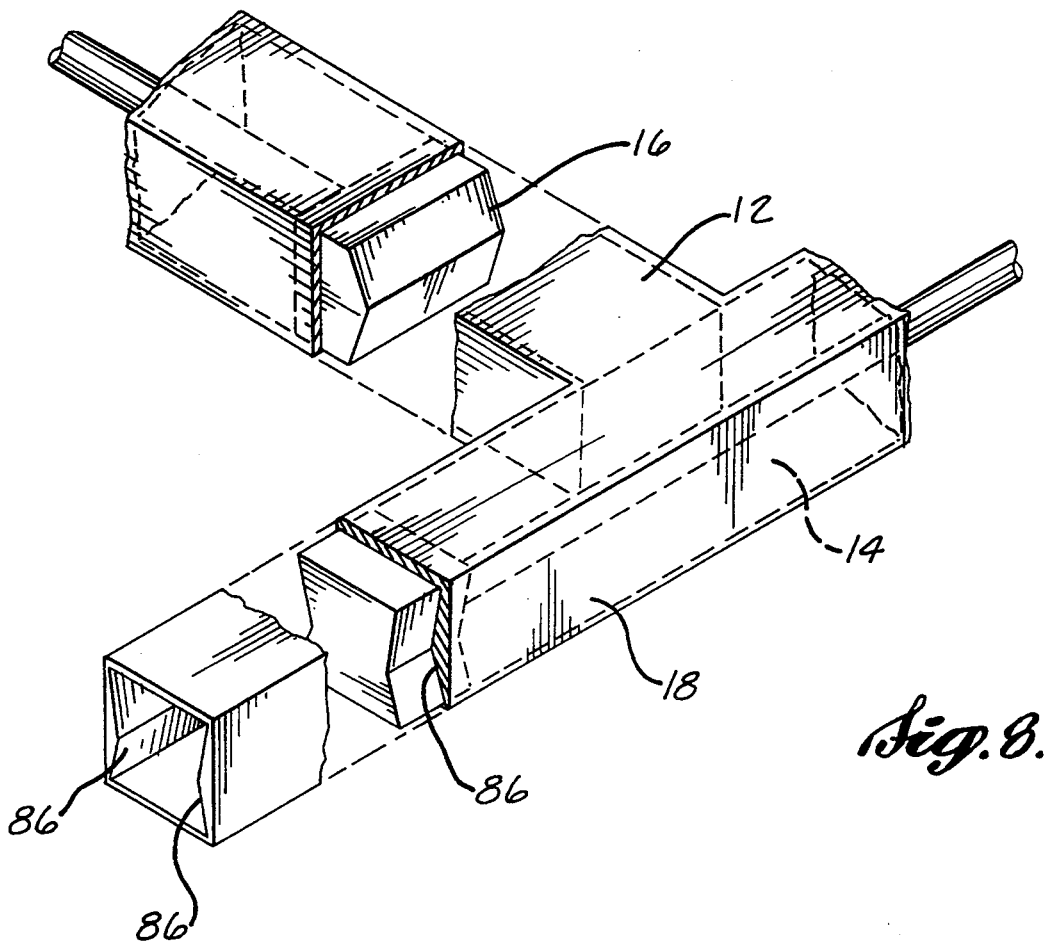
FIG. 8 is a perspective view of an alternate embodiment of the holding chamber, advancement piston, and compression piston of the invention, illustrating a different cross-sectional configuration of the chamber.

An alternate embodiment of holding chamber 18 and compression piston 16 is illustrated in FIG. 8. In this embodiment compression chamber 12 and holding chamber 18 do not have simple rectangular cross sections. Opposing interior walls 86 of holding chamber 18 and one wall 14 of compression chamber 12 as well as compression piston 16 have surfaces which slope inwardly toward the central axis of chambers 12, 18. The slopes in the embodiment shown are straight and extend the entire height of chambers 12, 18. However, in other alternative embodiments they may be curved or only partially sloped.

The advantage to compressing and delivering a bale to be netted in this manner can be understood when one realizes that after exiting holding chamber 18, the bale tends to expand in the direction it was previously compressed. Normally, then, when the bale enters the net, the sides of the net are pushed out. The corners can't push the net out as far as the middle, since to do so the net would have to stretch further. By compressing the sides of the bales further in their middles than at their corners, the natural expansion upon exiting from holding chamber 18 results in a netted bale with a more nearly perfect parallelepiped shape. This is the preferred shape for closest packing in shipment and storage.

Figure 9:
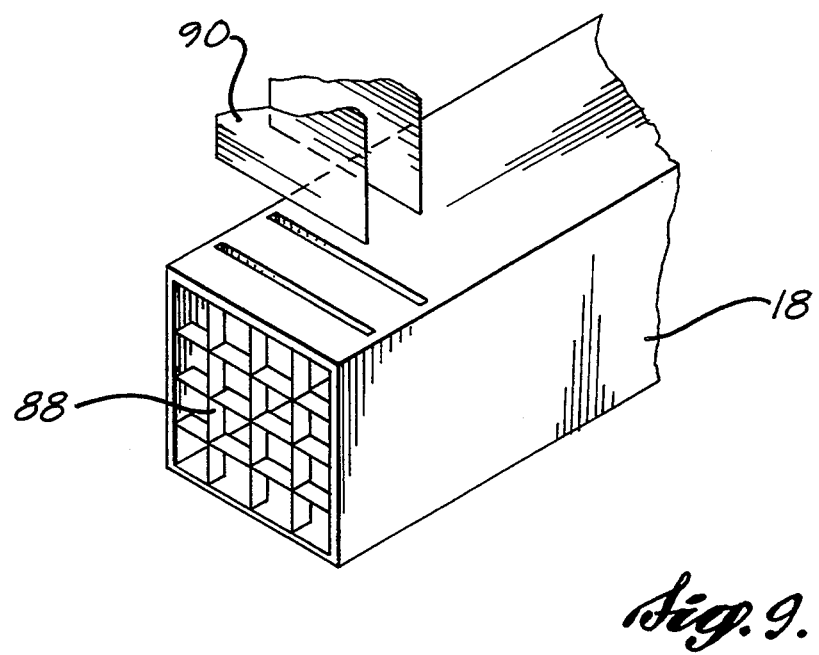
FIG. 9 is a perspective view of an alternate embodiment of the outlet of the holding chamber of the present invention, illustrating cutters to subdivide the material before it exits the chamber into the net.

FIG. 9 illustrates another alternate embodiment of the end of holding chamber 18 of the present invention. In this embodiment cutting blades 88 and 90 are used to subdivide bale 10 before it exits holding chamber 18 into net 26. Passive blades 88 passively cut bale 10 as it is pushed out holding chamber 18 into net 26. Active blades 90 are thrust through bale 10 as it rests at the end of holding chamber 18 and before net 26 is placed on chamber 18. Different numbers of blades 88, 90 may be used depending on the number of subdivisions desired.

Passive blades 88 are secured in horizontal and vertical orientations to the sides of holding chamber 18 so that a matrix of cuts are made through bale 10 as advancement piston 20 pushes it through outlet 22. Passive blades 88 are shown secured at the end of outlet 22 but could just as well be located anywhere along holding chamber 18 as long as the surface of passive blades 88 is parallel to holding chamber interior walls 86. In the preferred embodiment, passive blades 88 subdivide back 10 in a direction generally parallel to the lay of the fibers.

Active blades 90 are "active" in the sense that to subdivide or cut bale 10, they must be thrust through bale 10 as opposed to bale 10 being pushed through the blades. In the embodiment shown in FIG. 9, active blades 90 are shown positioned bear the end of holding chamber 18. However, in alternative embodiments, active blades 90 are placed at locations further back on holding chamber 18. In other alternate embodiments, active blades 90 are positioned to be thrust through the sides and bottom of holding chamber 18 rather than the top. Those skilled in the art will realize that several conventional means of driving active blades 90 are available. In one embodiment, they are pushed by hydraulic actuators. In another, they are pulled by cables attached to their sides as they ride in a guide track. Active blades 90 are used when a bale is in a stand-still position beneath them in holding chamber 18 such as when bale compression is taking place on an upstream bale so that advancement piston 20 is not moving the bale. Active blades 90 are thrust through the bale and retracted to allow the bale to be advanced.

Net 26 contains the subdivided bales well since it completely surrounds at least four sides of the bales. The natural friction between the subdivisions keeps the ends from failing out. Besides, the direction of compression is the direction to which the bale, subdivided or otherwise, tends to expand and push out the most. Net 26 surrounds the sides that push out the most so as to contain the subdivided bale.

Figure 10:
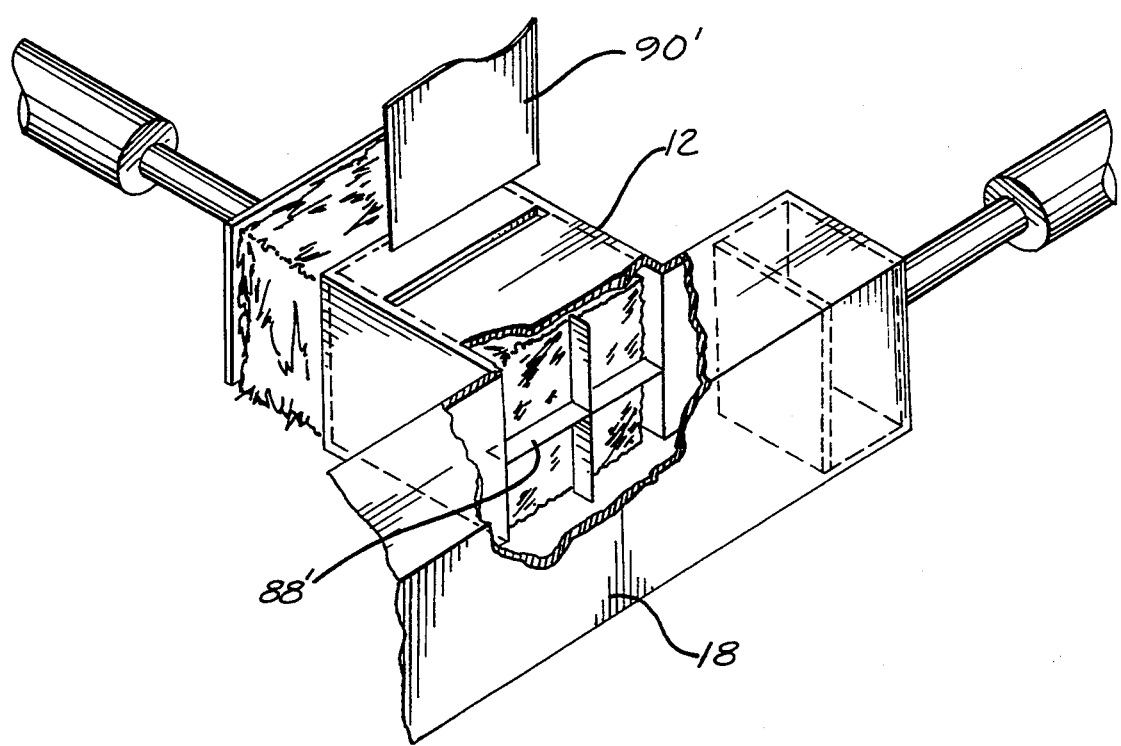
FIG. 10 is a perspective view of an alternate embodiment of the compression chamber of the present invention, illustrating cutters to subdivide the material before it enters the holding chamber.

FIG. 10 illustrates another arrangement of a system to subdivide bale 10. In this embodiment passive blades 88' are fixed across a portion of compression chamber 12 similar to passive blades 88 across the end of holding chamber 18 as illustrated in FIG. 9. Any number of blades 88' could alternatively be used. In the embodiment shown in FIG. 10 one horizontal and one vertical blade are used. Blades 88' in this embodiment cut bale 10 before it is compressed. Cutting bale 10 before compression is easier to do since less force is imposed on blades 88' at any given time.

Passive blades 88' cut bale 10 in a direction generally perpendicular to the direction in which passive blades 88 at the end of holding chamber 18 cut bale 10. The two blades 88, 88' may be used together to subdivide bale 10 in both directions.

Alternatively, an active blade 90' may be used to subdivide bale 10 in a direction generally perpendicular to the cut of passive blades 88'.

It should be obvious that any one or any combination of blades 88, 88', 90, and 90' may alternatively be used.

Subdividing and netting bales 10 as described above provides several advantages. First, most other methods of containment may not be feasible since the bale would fall apart if it were not encompassed by the net. The apparatus and method of the present invention allows bales 10 to be subdivided and effectively contained as a simple step inserted within the process of netting bales 10.

End users find subdivided bales 10 easier to distribute since they do not have to break bale 10 up by hand. Breaking up a compressed bale can be difficult. Subdivided bale 10 is also easier for the cattle to eat.

As stated above, while the preferred embodiment of the invention as well as a few alternate embodiments and aspects have been illustrated and described, it will be appreciated that various changes can be made therein without departing from the spirit and scope of the invention.

The embodiments of the invention in which an exclusive property or privilege is claimed are defined as follows:

1. An apparatus for inserting at least one compressed bale of a fibrous agricultural product into an elastomeric net, comprising:
   a. a holding chamber having an input end and an outlet; a line extending between the input end and the outlet defining a holding chamber axis;
   b. means for expanding and positioning a tubular net having two opposing open ends around the holding chamber so that a portion of one of the open ends of the net extends outwardly past an end of the outlet of the holding chamber; and
   c. means for advancing said bale through the outlet of the holding chamber so that the end of said bale exiting the outlet expands and contacts the portion of the net that extends outwardly past the end of the outlet and pulls the net off the holding chamber onto said bale as the bale is advanced out of the outlet, thereby containing the bale within the net.

2. The apparatus of claim 1, wherein the bale advancing means comprise an advancement piston to contact and advance the bale along the holding chamber axis, the advancement piston having an outside cross-sectional shape substantially matching the inside cross-sectional shape of the holding chamber.

3. An apparatus for inserting at least one bale of a compressed material into an elastomeric net, comprising:
 a. a holding chamber having an input end and an outlet; a line extending between the input end and the outlet defining a holding chamber axis;
 b. means for expanding and positioning the net around the holding chamber so that a portion of the net extends outwardly past an end of the outlet of the holding chamber;
 c. means for advancing said bale through the outlet of the holding chamber so that the end of said bale exiting the outlet expands and contacts the portion of the net that extends over the outlet and pulls the net off the holding chamber onto said bale as the bale is advanced, thereby containing the bale within the net; and
 d. at least one bale cutter coupled to the holding chamber for subdividing said bale before it enters and is contained by the net.

4. The apparatus of claim 3, wherein said bale cutter comprises at least one blade positioned across the end of the holding chamber outlet such that as said bale is advanced through the outlet said blade cuts said bale into multiple portions.

5. The apparatus of claim 3, wherein said bale cutter comprises at least one blade positioned perpendicular to the holding chamber axis, the holding chamber having wall slits through which the blade may be thrust, said blade cutting said bale into multiple portions before it is advanced into the net.

6. An apparatus for inserting at least one bale of material into an elastomeric net, comprising:
 a. a holding chamber having an input end and an outlet; a line extending between the input end and the outlet defining a holding chamber axis;
 b. a plurality of bars coupled together with a bar movement mechanism to move at least one of the bars away from at least one other of the bars to expand the net for placement over the outlet of the holding chamber so that a portion of the net extends over the outlet of the holding chamber; and
 c. means for advancing said bale through the outlet of the holding chamber so that said bale contacts the portion of the net that extends over the outlet and pulls the net off the holding chamber onto said bale as it is advanced, thereby containing the bale within the net.

7. The apparatus of claim 6, wherein the bar movement mechanism further comprises means to move the plurality of bars along an axis parallel to the bars, independent of the movement of the bars away from or toward each other, so that the expanding and positioning means can be used to position the net over the outlet of the holding chamber and the bars can be retracted therefrom.

8. The apparatus of claim 6, wherein the bars and the bar movement mechanism are disposed generally surrounding the holding chamber, the movement mechanism being arranged to move the plurality of bars partially beyond the outlet of the holding chamber to receive the net for expansion and placement on the outlet of the holding chamber.

9. The apparatus of claim 6, wherein the bars and the bar movement mechanism are disposed opposite the outlet of the holding chamber, the bars being oriented generally parallel to the holding chamber axis, the movement mechanism being arranged to move the plurality of bars partially over the outlet of the holding chamber to place the net on the outlet of the holding chamber.

10. The apparatus of claim 9, wherein the expanding and positioning means further comprise means to pivot the bars away from the outlet of the holding chamber to allow the net to be received over the bars.

11. The apparatus of claim 6, wherein the net is supplied from a continuous roll of flattened tubular netting material, the roll having a center axis of rotation, the apparatus further comprising the netting feed mechanism disposed adjacent to the plurality of bars for holding the netting material and feeding the material onto the ends of the bars and further comprising a net cutter positioned between the feed mechanism and the plurality of bars.

12. The apparatus of claim 11, wherein the net feed mechanism comprises:
 a. a base;
 b. a roll carrier having a rotatable connection to the base for holding the roll of netting material and allowing it to be pulled off as required; and
 c. at least one reflattening roller disposed adjacent the roll carrier and having a longitudinal axis oriented at an angle to the plane of the flattened tubular netting material so that when the netting material is fed through said reflattening roller the netting material receives two creases in addition to the creases preexistent at the edges of its originally flattened sides, the two additional creases along with the original creases causing the previously flattened tube of netting material to assume a box-like cross-sectional shape.

13. The apparatus of claim 12, further comprising at least one feed roller oriented parallel to the roll axis of the netting material and disposed between the roll carrier and said reflattening roller for pulling a portion of the netting material from the roll.

14. A method of inserting and maintaining a compressed fibrous material in an elastomeric net, comprising the steps of:
 a. expanding a tubular net having two opposing open ends so that at least a portion of the net has a cross-sectional area greater than that of a bale of the fibrous material;
 b. positioning the expanded net over a holding chamber having an outlet so that a portion of one of the open ends of the net extends outwardly past an end of the outlet, the holding chamber having walls forming a tube, the walls containing said bale in a compressed form;
 c. positioning said bale within the holding chamber; and
 d. advancing said bale through the outlet of the holding chamber so that an edge of said bale exiting the outlet expands and contacts the portion of the net that extends past the end of the outlet and pulls the net off the holding chamber onto said bale.

15. The method of claim 14, further comprising the steps of:
   a. supplying a continuous length of flat tubular netting material having two edges before the step of expanding the net; and
   b. cutting a predetermined length of the tubular netting material to form the net after the step of expanding the net.

16. The method of claim 15, further comprising the steps of pressing the tubular netting material to form creases in the netting material at locations other than the two edges so that the tubular netting material forms a box-like cross-sectional shape after the step of supplying the netting material and before the step of cutting the netting material.

17. A method of inserting at least one bale of fibrous material into an elastomeric net, comprising the steps of:
   a. compressing said bale before it is positioned within a holding chamber into a generally parallelepiped shape except that the sides of said bale are pressed into a concave shape before the bale is advanced out of the holding chamber;
   b. expanding the net so that at least a portion of the net has a cross-sectional area greater than that of said bale;
   c. positioning the expanded net over a holding chamber having an outlet so that a portion of the net extends over the outlet, the holding chamber having walls forming a tube, the walls containing said bale in a compressed form;
   d. positioning said bale within the holding chamber; and
   e. advancing said bale through the outlet of the holding chamber so that said bale contacts the portion of the net that extends over the outlet and pulls the net off the holding chamber onto said bale.

18. A method of inserting at least one bale of fibrous material into an elastomeric net, comprising the steps of:
   a. expanding the net so that at least a portion of the net has a cross-sectional area greater than that of said bale;
   b. positioning the .expanded net over a holding chamber having an outlet so that a portion of the net extends over the outlet, the holding chamber having walls forming a tube, the walls containing said bale in a compressed form;
   c. positioning said bale within the holding chamber;
   d. cutting said bale into a plurality of portions before it is advanced out of the outlet of the holding chamber; and
   e. advancing said bale through the outlet of the holding chamber so that said bale contacts the portion of the net that extends over the outlet and pulls the net off the holding chamber onto said bale.

19. A method of inserting at least one bale of fibrous material into an elastomeric net, comprising the steps of:
   a. expanding the net by separating a plurality of bars on which the net is disposed until at least a portion of the net has a cross-sectional area greater than that of the outlet of the holding chamber;
   b. positioning the expanded net over a holding chamber having an outlet so that a portion of the net extends over the outlet, the holding chamber having walls forming a tube, the walls containing said bale in a compressed form;
   c. positioning said bale within the holding chamber; and
   d. advancing said bale through the outlet of the holding chamber so that said bale contacts the portion of the net that extends over the outlet and pulls the net off the holding chamber onto said bale.

20. The method of claim 19, wherein the step of positioning the expanded net comprises moving the bars along an axis parallel to the bars, independent of the separation movement of the bars, so that the net can be positioned over the outlet of the holding chamber.

21. The method of claim 20, wherein the plurality of bars are disposed generally parallel to the axis of the holding chamber, and wherein the plurality of bars are disposed adjacent to the holding chamber when the net is in position to receive said bale.

22. The method of claim 20, wherein the step of positioning the expanded net further comprises retracting the bars together after the net is positioned over the outlet of the holding chamber so that the net contacts the holding chamber on at least outside corners of the outlet of the holding chamber.

23. An apparatus for compressing and containing a bale of a fibrous material in an elastomeric net in a compressed form, comprising:
   a. a compression chamber;
   b. a material compressor coupled to the compression chamber to compress a selected amount of the fibrous material within the compression chamber to form a compressed bale;
   c. a holding chamber having an outlet and an inlet coupled to the compression chamber, the holding chamber also having an axis defined by a line extending between the center of the inlet to the center of the outlet;
   d. a net expansion and placement mechanism for receiving a tubular net having two opposing open ends, and for stretching at least a portion of the net into a cross-sectional shape that is slightly larger than that of the holding chamber, and for placing the net over the holding chamber with a portion of one of the open ends of the net extending outwardly beyond the edge of the outlet; and
   e. a bale advance mechanism coupled to the holding chamber and compression chamber to advance the bale from the compression chamber to the holding chamber and through the holding chamber outlet such that an edge of the bale exiting the outlet expands and contacts the edge of the net that extends beyond the edge of the outlet and pulls the net onto the bale when the bale advances through the outlet.

24. The apparatus of claim 23, wherein the net expansion and placement mechanism comprises a plurality of bars coupled together with a bar movement mechanism to move at least one of the bars away from at least one other of the bars to expand the net for placement over the outlet of the holding chamber.

25. The apparatus of claim 24, wherein the bar movement mechanism further comprises a means to move the plurality of bars along an axis parallel to the bars independent of the movement of the bars away from or toward each other so that the expansion and placement mechanism can be used to position the net over the outlet of the holding chamber and can be retracted therefrom.

26. The apparatus of claim 24, wherein the net is supplied from a continuous roll of flattened tubular netting material, the roll having a center axis of rotation, the apparatus further comprising a net feed mechanism disposed adjacent to the plurality of bars for holding the netting material and feeding the material onto the ends of the bars, wherein the net feed mechanism comprises:

a. a roll carrier having a rotatable connection to a base for holding the roll of netting material and allowing it to be pulled off as required; and b. at least one reflattening roller disposed adjacent the roll carrier and having a longitudinal axis oriented at an angle to the plane of the flattened tubular netting material so that when the netting material is fed through said reflattening roller the netting material receives two creases in addition to the creases preexistent at the edges of its originally flattened sides, the two additional creases along with the original creases causing the previously flattened tube of netting material to assume a box like cross-sectional shape.

27. An apparatus for compressing and containing a fibrous material in an elastomeric net, comprising:

a. a compression chamber;

b. a material compressor coupled to the compression chamber to compress a selected amount of the fibrous material within the compression chamber to form a compressed bale;

c. a holding chamber having an outlet and an inlet coupled to the compression chamber, the holding chamber including a plurality of walls forming a tube, the plurality of walls including a first wall and, a second wall being positioned opposite the first wall, wherein at least portions of the cross-sectional shapes of the insides of the first wall and the second wall slope toward the inside of the holding chamber, the holding chamber also having an axis defined by a line extending between the center of the inlet to the center of the outlet;

d. a net expansion and placement mechanism for receiving the net, stretching at least a portion of the net into a cross-sectional shape that is slightly larger than that of the holding chamber, and placing the net over the holding chamber with one end of the net extending beyond the outlet; and e. a bale advance mechanism coupled to the holding chamber and compression chamber to advance the bale from the compression chamber to the holding chamber and through the holding chamber outlet such that the bale contacts the end of the net that extends beyond the outlet and pulls the net onto the bale when the bale advances through the outlet.

28. An apparatus for compressing and containing a fibrous material in an elastomeric net, comprising:

a. a compression chamber;

b. a material compressor coupled to the compression chamber to compress a selected amount of fibrous material within the compression chamber to form a compressed bale;

c. a holding chamber having an outlet and an inlet coupled to the compression chamber, the holding chamber having an axis defined by a line extending between the center of the inlet to the center of the outlet;

d. a net expansion and placement mechanism for receiving the net, stretching at least a portion of the net into a cross-sectional shape that is slightly larger than that of the holding chamber, and placing the net over the holding chamber with one end of the net extending beyond the outlet;

e. a bale advancement mechanism coupled to the holding chamber and compression chamber to advance the bale from the compression chamber to the holding chamber and through the holding chamber outlet such that the bale contacts the end of the net that extends beyond the outlet and pulls the net onto the bale when the bale advances through the outlet; and f. at least one bale cutter coupled to the holding chamber for subdividing said bale before it enters and is contained by the net.

29. An apparatus for cutting and containing at least one bale in an elastomeric net comprising:

a. a first chamber having a first longitudinal axis and a first outlet;

b. a first advancement mechanism coupled to the first chamber for advancing said bale through the first chamber;

c. at least one first chamber blade attached to the first chamber so that said bale is divided before the bale exits the first chamber; and, d. a net expansion and placement mechanism for receiving the net, stretching the net into a cross-sectional shape that is slightly larger than that of the first chamber, and placing the net over a portion of the first chamber with one end of the net slightly extending beyond the first outlet.

30. The apparatus of claim 29, wherein said bale is divided by the first chamber blade in a direction parallel to the first longitudinal axis, the apparatus further comprising:

a. a second chamber having a second outlet and a second longitudinal axis oriented generally perpendicular to the first longitudinal axis, said second chamber being coupled to the first chamber;

b. a second advancement mechanism coupled to the second chamber for advancing said bale through the second chamber and out the second outlet into the first chamber; and, c. at least one second chamber blade secured within the second chamber so that said bale is divided in a direction parallel to the second longitudinal axis before the bale exits the second chamber.

31. An apparatus for inserting at least one bale of material into an elastomeric net comprising:

a. a holding chamber having an input end and an output; a line extending between the input end and the outlet defining a holding chamber axis, the holding chamber also including a plurality of walls forming a tube, the plurality of walls including a first wall and a second wall positioned opposite the first wall, wherein at least portions of the cross-sectional shapes of the insides of the first wall and the second wall slope toward the inside of the holding chamber;

b. means for expanding and positioning the net around the holding chamber so that a portion of the net extends over the outlet of the holding chamber; and c. means for advancing the bale through the outlet so that the bale contacts the portion of the net that extends over the outlet and pulls the net off the holding chamber onto the bale as the bale is advanced, thereby containing the bale within the net.

* * * * *

UNITED STATES PATENT AND TRADEMARK OFFICE
CERTIFICATE OF CORRECTION

PATENT NO. : 5,392,591  
DATED : February 28, 1995  
INVENTOR(S) : B. Simpson

It is certified that error appears in the above-indentified patent and that said Letters Patent is hereby corrected as shown below:

| COLUMN | LINE | |
|---|---|---|
| [57] (Col. 2) | Abstract (line 2 of text) | "net(26)" should read --net (26)-- |
| [57] (Col. 2) | Abstract (line 3 of text) | "chamber(12)" should read --chamber (12)-- |
| [57] (Col. 2) | Abstract (line 3 of text) | "compressor(16)" should read --compressor (16)-- |
| [57] (Col. 2) | Abstract (line 4 of text) | "chamber(18)" should read --chamber (18)-- |

UNITED STATES PATENT AND TRADEMARK OFFICE
CERTIFICATE OF CORRECTION

PATENT NO. : 5,392,591
DATED : February 28, 1995
INVENTOR(S) : B. Simpson

It is certified that error appears in the above-indentified patent and that said Letters Patent is hereby corrected as shown below:

| COLUMN | LINE | |
|---|---|---|
| 10 | 44 | "Four-bar" should read --four-bar-- |
| 10 | 59 | Before "note" insert --(-- |
| 11 | 49 | "back" should read --bale-- |
| 11 | 55 | "bear" should read --near-- |
| 12 | 7 | "failing" should read --falling-- |
| 17 (Claim 26, | 5 line 9) | "cartier" should read --carrier-- |
| 17 (Claim 26, | 17 line 21) | "box like" should read --box-like-- |
| 17 (Claim 28, | 56 line 5) | Before "fibrous" insert --the-- |
| 18 (Claim 29, | 23 line 10) | After "and" delete --,-- |
| 18 (Claim 30, | 41 line 12) | After "and" delete --,-- |

UNITED STATES PATENT AND TRADEMARK OFFICE
CERTIFICATE OF CORRECTION

PATENT NO. : 5,392,591
DATED : February 28, 1995
INVENTOR(S) : B. Simpson

It is certified that error appears in the above-indentified patent and that said Letters Patent is hereby corrected as shown below:

| COLUMN | LINE | |
|---|---|---|
| 1 | 56 | "used:" should read --used;-- |
| 2 | 5 | "They" should read --they-- |
| 2 | 6 | "expensive:" should read --expensive;-- |
| 2 | 57 | "a least" should read --at least-- |
| 2 | 61 | "is" should read --has-- |
| 4 | 39 | "producing" should read --produced-- |
| 5 | 33 | Delete "and" |
| 6 | 27 | "fiat" should read --flat-- |
| 6 | 50 | "FIG. 2B4" should read --FIG. 2B.-- |
| 7 | 9 | "end" should read --and-- |

UNITED STATES PATENT AND TRADEMARK OFFICE
CERTIFICATE OF CORRECTION

PATENT NO. : 5,392,591
DATED : February 28, 1995
INVENTOR(S) : B. Simpson

It is certified that error appears in the above-indentified patent and that said Letters Patent is hereby corrected as shown below:

| Column | Line | |
|---|---|---|
| 7 | 44 | After "46" insert --,-- |
| 9 | 33 | "well-known" should read --well known-- |
| 10 | 14 | "outer-most" should read --outermost-- |

Signed and Sealed this

Twenty-third Day of May, 1995

Attest:

BRUCE LEHMAN

*Attesting Officer*    *Commissioner of Patents and Trademarks*